(12) United States Patent
Worick et al.

(10) Patent No.: US 8,983,551 B2
(45) Date of Patent: Mar. 17, 2015

(54) WEARABLE NOTIFICATION DEVICE FOR PROCESSING ALERT SIGNALS GENERATED FROM A USER'S WIRELESS DEVICE

(76) Inventors: Lovina Worick, Santa Clara, CA (US); Warren H. Myer, San Jose, CA (US)

(*) Notice: Subject to any disclaimer, the term of this patent is extended or adjusted under 35 U.S.C. 154(b) by 445 days.

(21) Appl. No.: 11/253,005

(22) Filed: Oct. 18, 2005

(65) Prior Publication Data
US 2007/0087790 A1    Apr. 19, 2007

(51) Int. Cl.
*H04M 1/00* (2006.01)
*H04W 24/00* (2009.01)
*H04M 19/04* (2006.01)

(52) U.S. Cl.
CPC .................................. *H04M 19/041* (2013.01)
USPC ........................................ 455/567; 455/456.1

(58) Field of Classification Search
USPC .................... 455/567, 550.1, 557, 569.1, 426
See application file for complete search history.

(56) References Cited

U.S. PATENT DOCUMENTS

| | | | |
|---|---|---|---|
| 6,272,359 B1* | 8/2001 | Kivela et al. ................. | 455/567 |
| 6,954,659 B2* | 10/2005 | Tushinsky et al. ........... | 455/567 |
| 2005/0159190 A1* | 7/2005 | Dowling ....................... | 455/567 |
| 2005/0233774 A1* | 10/2005 | Ladouceur et al. .......... | 455/567 |

OTHER PUBLICATIONS

Ellsworth, Mike, "Personal Wireless Devices", http://www.bizforum.org/whitepapers/wireless.htm, The Business Forum,19 pgs.

* cited by examiner

*Primary Examiner* — Michael Faragalla
(74) *Attorney, Agent, or Firm* — Raj Abhyanker, P.C.

(57) ABSTRACT

Methods and apparatus for wearable notification are disclosed. In one example embodiment, a method includes communicating a trigger data to a wearable device when processing an incoming signal, automatically generating a response on the wearable devise based on the trigger data, and remotely programming at least one parameter associated with the wearable notification devise. The method may be in a form of a machine-readable medium embodying a set of instructions that, when executed by a machine, cause the machine to perform the method. The wearable device may be physically coupled to a biological external tissue of the human body. The processing of the incoming signal may be performed on a microprocessor in a housing detachably attached to a telephone, and may be based on a parameter value of a kitchen appliance having a timer, or a state change of a doorbell.

18 Claims, 10 Drawing Sheets

| SENDER ID | RECIPIENT ID | NETWORK BASED WEARABLE NOTIFICATION DEVICE ID | LOCAL WEARABLE NOTIFICATION DEVICE SELECTOR | TYPE OF SELECTED WEARABLE NOTIFICATION DEVICE | NOTIFICATION TYPE | TIME SETTING | RING SETTING |
|---|---|---|---|---|---|---|---|
| 1111 - 2222 | 3333 - 4444 | 555 - 6666 | ENABLE | NETWORK - BRACELET LOCAL-RING | NETWORK - VIBRATION LOCAL-BLINK | NETWORK - 6 AM - 6 PM LOCAL - 6 PM - 6 AM | NETWORK - 1 RING TONE LOCAL - 3 RING TONES |
| 7777 - 8888 | 9999 - 1010 | N / A | ENABLE | LOCAL - BRACELET | LOCAL - VIBRATION | LOCAL - 24 HOURS | LOCAL - 1 RING TONE |
| ... | ... | ... | ... | ... | ... | ... | ... |

FIGURE 4

WEARABLE NOTIFICATION DEVICE FOR PROCESSING ALERT SIGNALS GENERATED FROM A USER'S WIRELESS DEVICE

FIELD OF TECHNOLOGY

This disclosure relates generally to the field of telecommunications, and, in one example embodiment, to a method, an apparatus, and a system associated with wearable notification.

BACKGROUND

A pager may be a telecommunication device that enables a sending user to communicate with a receiving user. The pager may be carried by the receiving user and may process (e.g., receive, send, generate, etc.) an alert signal (e.g., an audible beep, a visual flash, a physical vibration, and/or a text display, etc.) based on a telephone call placed by the sender user that is associated with the pager carried by the receiving user. The receiving user may physically carry the pager on their person to receive the alert signal based on the telephone call. To operate, the pager may require maintenance of an expensive backbone paging network to function in a mobile phone environment.

The mobile phone may be a portable communication device which allows a user (e.g., a sending user and/or a receiving user) to move over a wide area during a telephone call. The mobile phone may include an alphanumeric keypad, a display, a processor, and/or a transmitter/receiver circuitry. A physical shrinkage of the mobile phone is limited because the mobile phone needs to permit the user to physically press a key on the alphanumeric keypad and/or to view the display. Because of the physical shrinkage limitation, the receiving user may carry the mobile phone in a separate container (e.g. a purse, a duffle-bag, a locker, a cabinet, etc.). If the separate container having the mobile phone is physically away (e.g., in a different room of a house) from the receiving user's person (e.g., a female user may leave her purse in a particular room the house and walk to another room of the house), then the receiving user (e.g., the receiving user may be allocated the mobile phone in the separate container) may not be made aware of an alert signal (e.g., an audible beep, a visual flash, a physical vibration, and/or a text display, etc.) generated based on the telephone call associated with the mobile device in the separate container.

SUMMARY

Methods and apparatus for wearable notification are disclosed. In one example embodiment, a method includes communicating a trigger data to a wearable notification device (e.g. one or more of a ring, a bracelet, and a necklace) when processing an incoming signal, and automatically generating a response on the wearable notification device based on the trigger data. The method may be in a form of a machine-readable medium embodying a set of instructions that, when executed by a machine, cause the machine to perform the method.

At least one parameter (e.g. one or more of a source of the trigger data, a delay of the response, and a time of day setting of the response, and a distance threshold of the response) associated with the wearable notification device may be remotely programmed based on an input data received in a network enabled application. An alert signal (e.g. one or more of a vibration, an auditory sound, and a visual display) may be simultaneously generated on a two-way mobile communication device and on the wearable notification device based on the incoming signal.

The wearable notification device may be physically coupled to a biological external tissue of a human body, and may receive the trigger data at least 25 feet away from a source of the processing of the incoming signal. The processing of the incoming signal may be performed on a microprocessor in a housing detachably attached to a telephone, and may be based on a parameter value of a kitchen appliance having a timer, or a state change of a doorbell. The incoming signal may be generated based on a receipt of one or more of a markup language document, a facsimile, a phone call, and a calendar reminder appointment Further, an Internet Protocol (IP) address of the wearable notification device may be registered on an IP network through a wireless access point (through which the trigger data may be generated), and an acknowledgement of the response may be transmitted to a central database of the IP network. A radio frequency identification tag (RFID) tag may be embedded in the wearable notification device; and the trigger may be generated by a RFID host controller that identifies a presence of the wearable notification device within an operable range of the RFID tag.

In another aspect, a method includes detecting a wearable notification device registered on a network; generating a parameter setting associated with the wearable notification device; and wirelessly communicating the parameter setting to the wearable notification device. The wireless network may be detected through a radio frequency identification (RFID) method. In addition, the method may include disabling at least one operation of the wearable notification device to conserve battery life in the wearable notification device.

In yet another aspect, an apparatus includes a notification module coupled to a biological external tissue to process a trigger data received wirelessly from a communication device and to generate a response; and a selection module to allocate a parameter setting to the response based on a network enabled application setting. The apparatus may also include a local response module to determine whether the communication device is an intermediate network element or a local transmitter.

Other features will be apparent from the accompanying drawings and from the detailed description that follows.

BRIEF DESCRIPTION OF THE DRAWINGS

Example embodiments are illustrated by way of example and not limitation in the Figures of the accompanying drawings, in which like references indicate similar elements and in which:

FIG. 4 is a table view of the resolution table as described in FIG. 1, according to one embodiment.

Other features of the present embodiments will be apparent from the accompanying drawings and from the detailed description that follows.

DETAILED DESCRIPTION

Wearable notification is disclosed. In the following description, numerous specific details are set forth in order to provide a thorough understanding of various embodiments. It will be evident, however, to one skilled in the art that the various embodiments may be practiced without these specific details. An example embodiment provides methods and systems to generate a trigger data using a receiver communication device when receiving an incoming signal and to communicate the trigger data via a network and/or locally to a remote wearable notification device to respond (e.g., generate a vibration, an auditory sound, a visual display, etc.) based on the trigger data. It will be appreciated that the various embodiments discussed herein may/may not be the same embodiment, and may be grouped into various other embodiments not explicitly disclosed herein.

Figure 1:
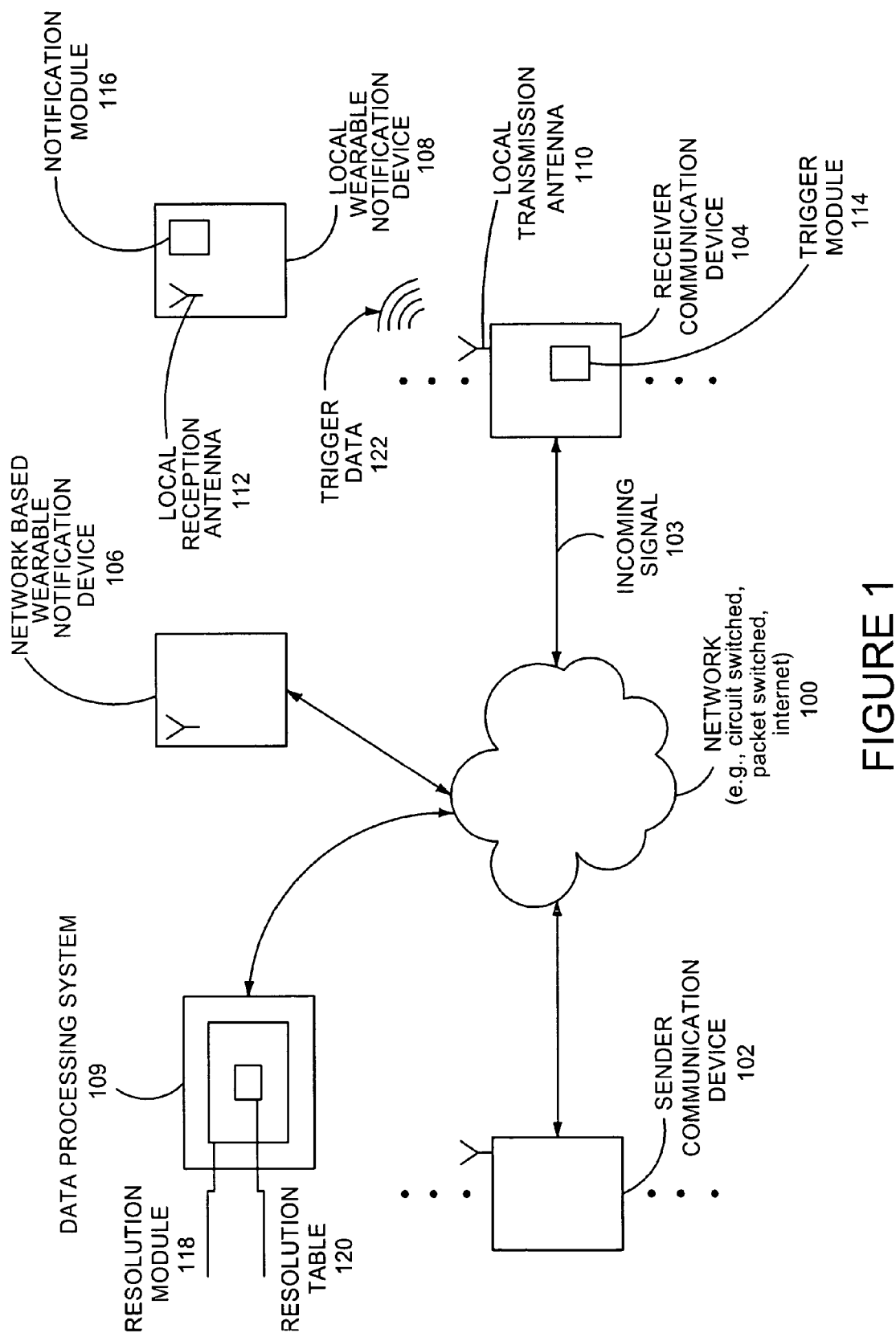
FIG. 1 is a block diagram of a network which connects a sender communication device, a receiver communication device, a network based wearable notification device, a local wearable notification device, and a data processing system together, according to one embodiment.

FIG. 1 is a block diagram of a network 100 which connects a sender communication device 102, a receiver communication device 104, a network based wearable notification device 106, a local wearable notification device 108, and a data processing system 109 together, according to one embodiment. In FIG. 1, the sender communication device 102 may send an incoming signal 103 to the receiver communication device 104 through the network 100

The incoming signal 103 may enable a trigger module 114 of the receiver communication device 104, thereby communicating a trigger data 122 through a local transmission antenna 100. The trigger data 122 received by a local reception antenna 112 may enable a notification module 116 of the local wearable notification device 108 to respond automatically. The incoming signal 103 may also enable the network based wearable notification device 106. Furthermore, the incoming signal 103 may simultaneously generate an alert signal (e.g., a vibration, an auditory sound, a visual display, etc.) on a two-way communication device and on the wearable device(s). The data processing system 109 may process an input data via a resolution module 118 to produce a resolution table 120.

Figure 2:
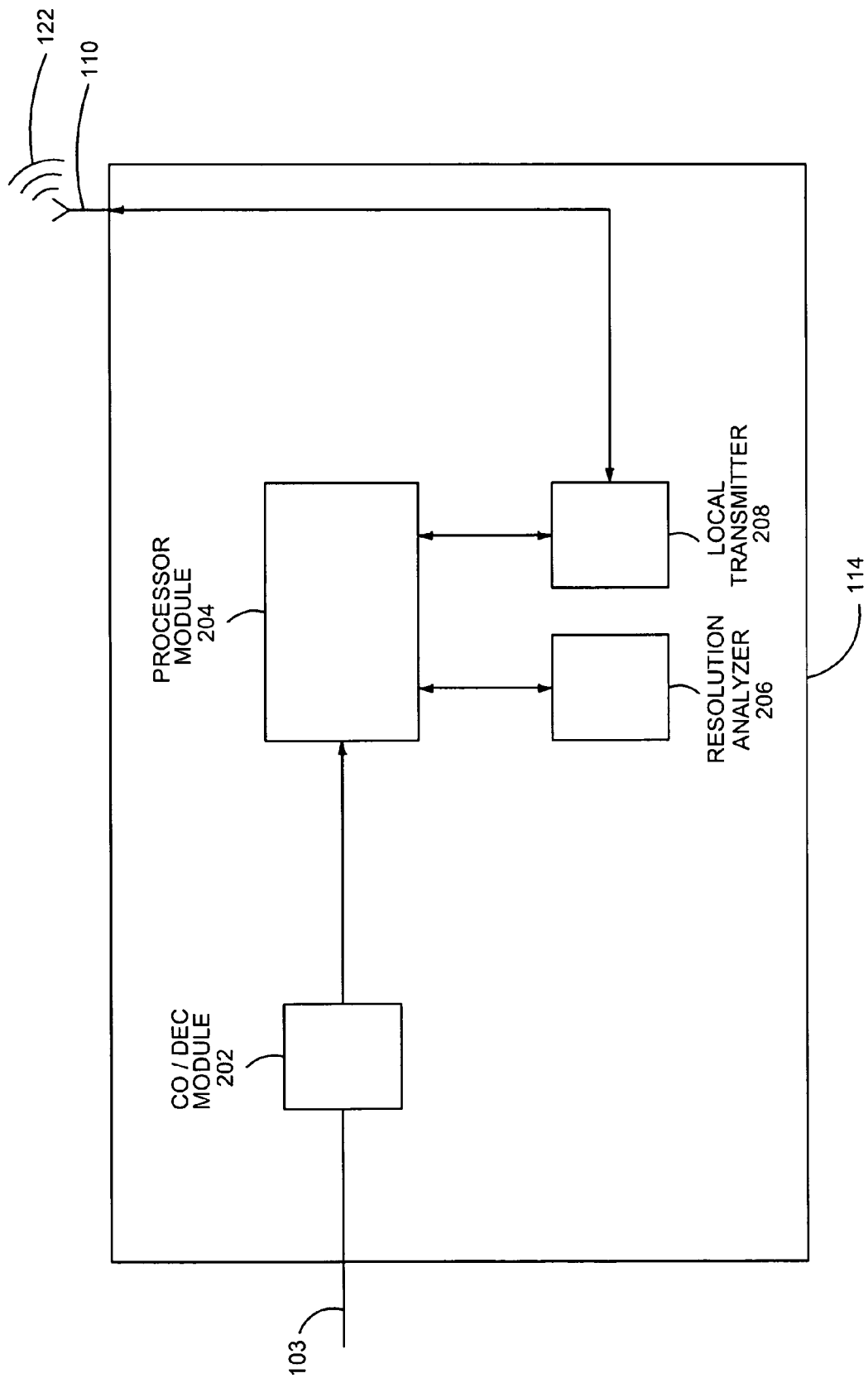
FIG. 2 is an exploded view of the trigger module of the receiver communication device, according to one embodiment.

FIG. 2 is an exploded view of the trigger module 114 of the receiver communication device 104, according to one embodiment. A co/dec module 202 may receive the incoming signal 103 and may convert (e.g., decode, decompress, demodulate, etc.) to a data type which feeds into a processor module 204. The incoming signal 103 fed into the processor module 204 may communicate with a resolution analyzer 206 to determine whether the trigger data 122 needs to be generated. If that is the case, then the processor module 204 may generate the trigger data 122 and send the trigger data 122 wirelessly via a local transmitter 208 to the local wearable notification device 108 and/or to the network based wearable notification device 106 through the network 100 of FIG. 1. The trigger module 114 (e.g., the trigger module 114 may process the incoming signal 103 in a microprocessor in the housing) may be encased in a housing detachably attached to the receiver communication device 104 of FIG. 1 (e.g., so as to enable the user to keep it in a backpack or other carrying means rather easily).

Figure 3:
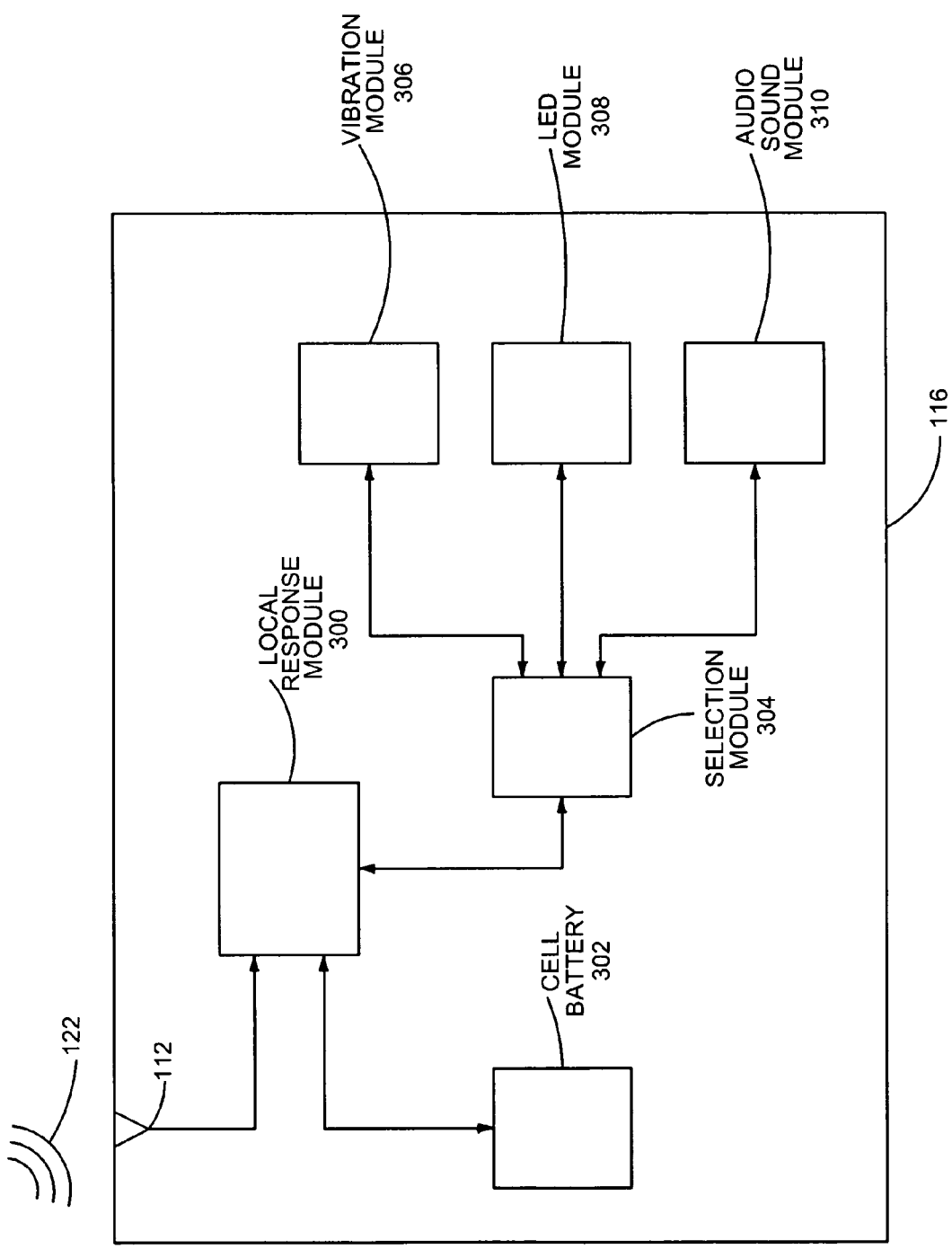
FIG. 3 is an exploded view of the notification module, according to one embodiment.

FIG. 3 is an exploded view of the notification module 116, according to one embodiment. The trigger data 122 received by the local reception antenna 112 may be processed by a local response module 300 which may determine whether the trigger data 122 is from an intermediate network element or the local transmitter 208 of FIG. 2. If the trigger data 122 is from the local transmitter 208, the local response module 300 may send the trigger data 122 to a selection module 304 (e.g., a demux circuit) to enable at least one of a vibration module 306, a light emitting diode (LED) module 308, and an audio sound module 310.

The vibration module 306 may vibrate (e.g., using a micro motor) on a biologically external tissue of a user for a set period (e.g., a few seconds) and/or until the user confirms a receipt of the incoming signal 103 of FIG. 1 when the vibration module 306 is enabled. The LED module 308 may blink a colored light for the set period or until the user confirms the receipt of the incoming signal 103 when the LED module 308 is enabled. The audio sound module 310 may beep a sound for the set period or until the user confirms the receipt of the incoming signal 103 when the audio sound module 310 is enabled. A cell battery 302 may be used to sustain (e.g., by providing electricity) the notification module 116 of the local wearable notification device 108 of FIG. 1.

FIG. 4 is a table view of the resolution table 120 as described in FIG. 1, according to one embodiment. The resolution table 120 may include a sender identification (ID) field 402, a recipient ID field 404, a network based wearable notification device ID field 406, a local wearable notification device selector field 408, a type of selected wearable notification device field 410, a notification type field 412, a time setting field 414, and/or a ring setting field 416.

The sender ID field 402 may be an identification number (e.g., a phone number, IP address, etc) assigned to the sender communication device 102 which is associated with the data processing system 109. The recipient ID 404 field may be the identification number assigned to the receiver communication device 104 which is associated with the data processing system 109 and/or with the local wearable notification device 108 of FIG. 1. The network based wearable notification device ID field 406 may be the identification number assigned to the network based wearable notification device 106. The local wearable notification device selector field 408 may display the state (e.g., enable or disable) of the local wearable notification device 108 which is associated with the receiver communication device 104 of FIG. 1.

The type of selected wearable notification device field 410 may record a type(s) (e.g., a bracelet, a ring, etc.) of the local wearable notification device 108 and/or the network based wearable notification device 106 associated with the data processing system 109 of FIG. 1. The notification type field 412 may display a type(s) (e.g., a vibration, an auditory sound, a visual display, etc.) of notification selected for the local wearable notification device 108 and/or the network based wearable notification device 106. The time setting field 414 may display a time period when the local wearable notification device 108 and/or the network based wearable notification device 106 are/is enabled. The ring setting field 416 may indicate a number of an alert signal (e.g., a ring) allowed before the network based wearable notification device 106 and/or the local wearable notification device 108 are/is triggered. There may be an other field(s) which may include any other data that may be useful to the local wearable notification device 108 and the network based wearable notification device 106.

Figure 5:
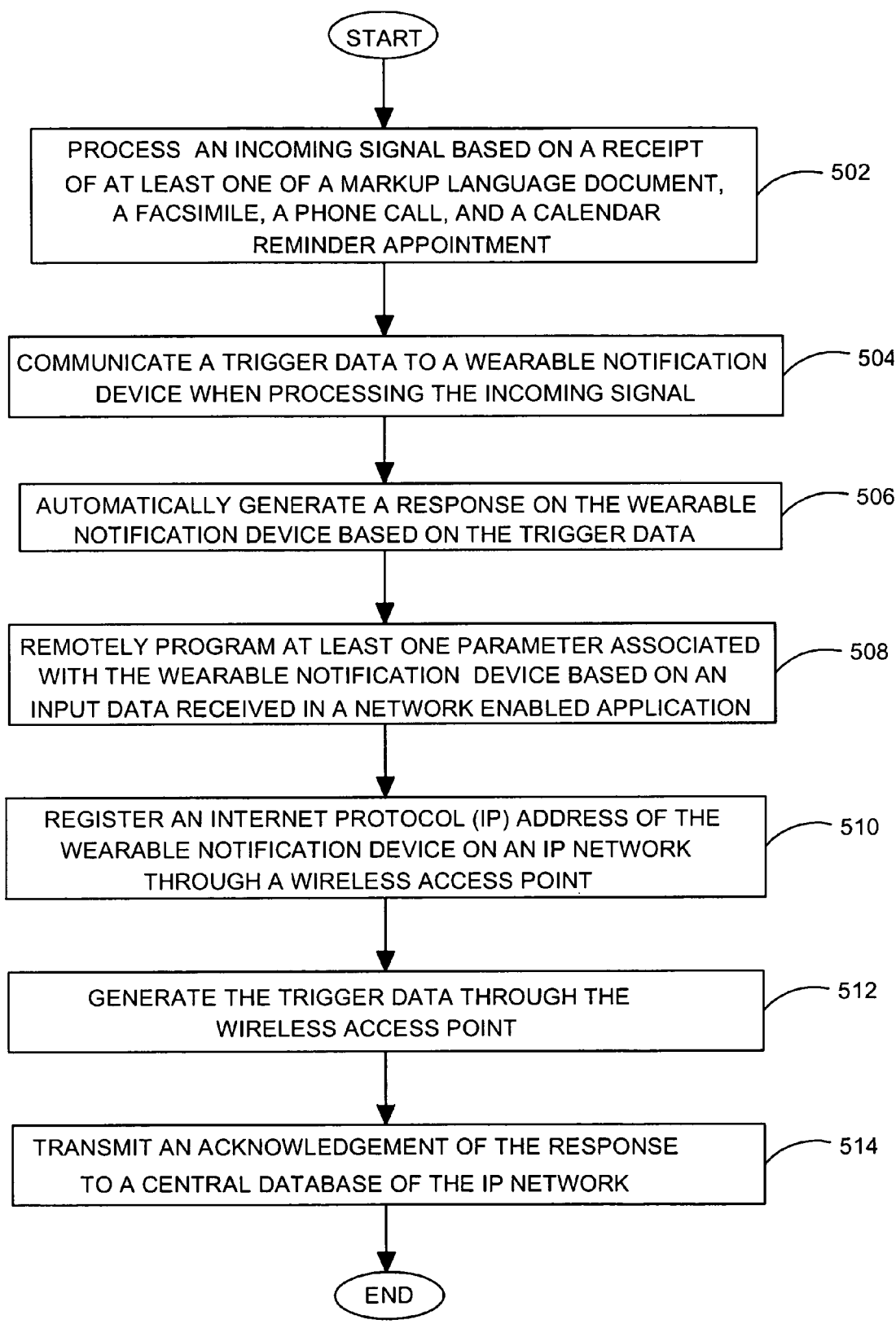
FIG. 5 is a process flow to automatically generate a response on the wearable notification device when processing the incoming signal to generate the trigger data, according to one embodiment.

FIG. 5 is a process flow to automatically generate (e.g., generate using the notification module 116 of FIG. 3) a response on the wearable notification device(s) when processing the incoming signal 103 to produce (e.g., produce using the trigger module 114 of FIG. 2) the trigger data 122, according to one embodiment. In operation 502, the receiver communication device 104 (e.g., a computer, a fax machine, a cell phone, a PDA, etc.) of FIG. 1 may process the incoming signal 103 when receiving at least one or more of a markup language document, a facsimile, a phone call, and a calendar reminder appointment (e.g., useful when a user is waiting for urgent message(s) but the user cannot stay next to the receiver communication device(s) 104 all the time) to generate the trigger data 122 (e.g., to notify the network based wearable notification device 106 at least 25 feet away from an wireless access point).

In operation 504, the trigger module 114 of FIG. 2 may communicate the trigger data 122 to the local wearable notification device 108 and/or the network based wearable notification device 106 as described in FIG. 1. Next, in operation 506, the network based wearable notification device 106 and the local wearable notification device 108 may automatically generate the response (e.g., the vibration, the auditory sound, the visual display, etc.) using the notification module 116 in FIG. 3 based on the trigger data 122.

Then, in operation 508, it may be possible to remotely program at least one parameter (e.g., a source of the trigger data, a delay of the response, a time of day setting of the response, a distance threshold of the response, etc.) associated with the network based wearable notification device 106 and/or the local wearable notification device 108 based on the input data received in a networked enabled application. In operation 510, the network based wearable notification device 106 may be registered (e.g., using Dynamic Host Configuration Protocol (DHCP) which is a client-server networking protocol where a DHCP server provides configuration parameters specific to a DHCP client host requesting, generally, information required by the host to participate on the Internet network) to obtain an identification number (e.g., IP address) on an IP network (e.g., using the IP network may allow the operation of the wearable device(s) in a relatively cheap price) via a wireless access point. The trigger data 122, in operation 512, may be generated through the wireless access point when processing the incoming signal 103. Then, in operation 514, the network based wearable notification device 106 may transmit an acknowledgement of the response to a central database of the IP network.

Figure 6:
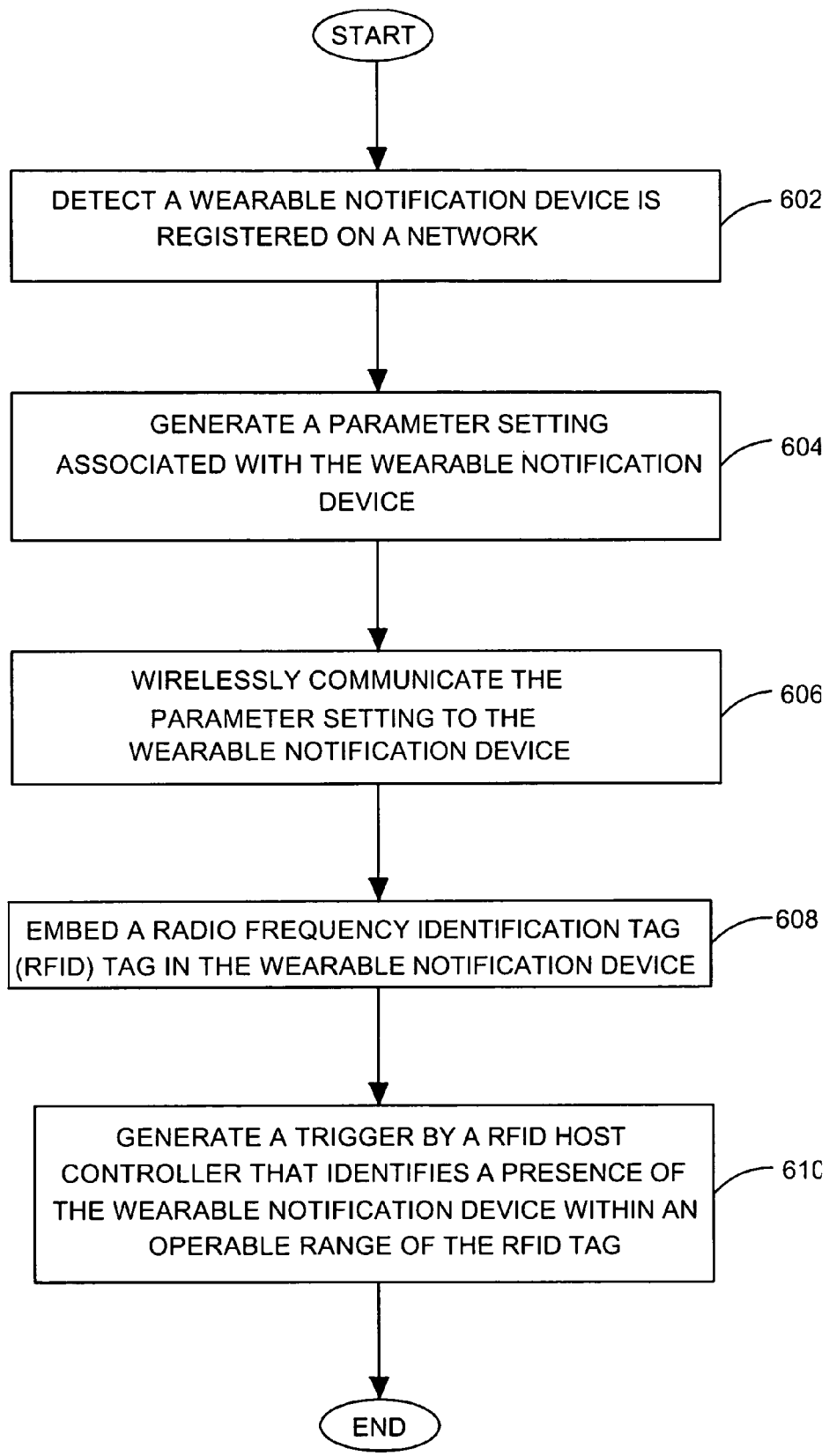
FIG. 6 is a process flow to detect the network based wearable notification device and/or the local wearable notification device and wirelessly communicate to the wearable notification device(s) to generate and/or set at least one parameter associated with the wearable device(s), according to one embodiment.

FIG. 6 is a process flow to detect the network based wearable notification device 106 and/or the local wearable notification device 108 and wirelessly communicate to the wearable notification device(s) to generate and/or set at least one parameter associated with the wearable device(s), according to one embodiment. In operation 602, the trigger module 114 of FIG. 1 may detect the network based wearable notification device 106 which is registered (e.g., assigned the IP address) on the network 100. In operation 604, the data processing system 109 (e.g., a server, a computer, a cell phone, a PDA, etc.) may enable a user to program at least one parameter (e.g., the source of the trigger, the delay of the response, the time of day setting of the response, and the distance threshold of the response) associated with the wearable notification device(s) through a user interface program.

Once the at least one parameter is set, in operation 606, the data processing system 109 may communicate the at least one parameter to the wearable notification device(s). Another example, according to operation 608, is to embed (e.g., register on the network 100) a radio frequency identification (RFID) tag in the wearable notification device(s) (e.g., this may be a cost effective solution when the price of RFID tag becomes readily affordable). As operation 610 illustrates, the receiver communication device 104 may generate the trigger data 122 based on the incoming signal 103 when a RFID host controller identifies a presence of the wearable notification device(s) within an operable range of the RFID tag. Furthermore, at lease one operation of the wearable notification device(s) may be turned off to conserve a life of the cell battery 302.

Figure 7:
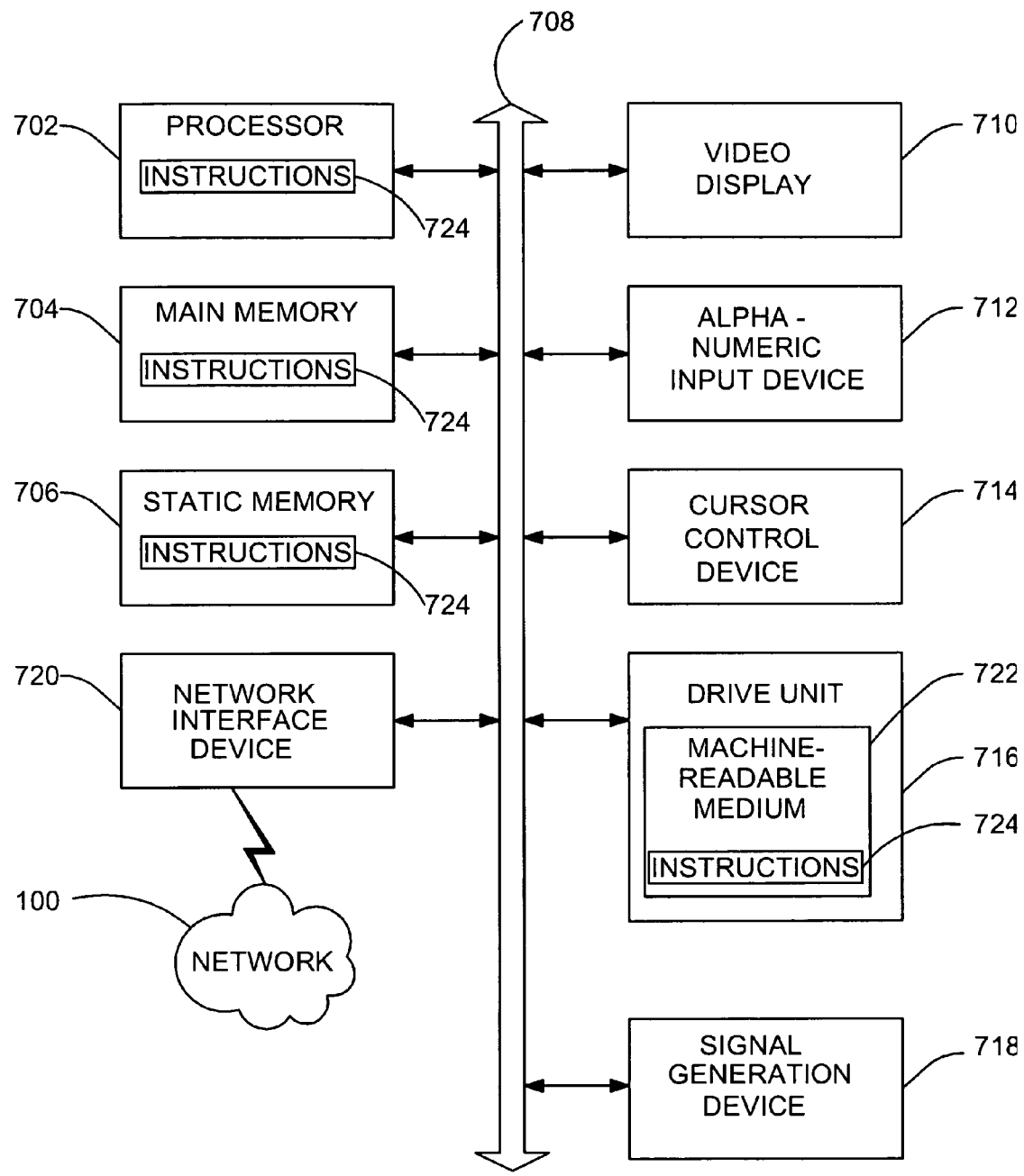
FIG. 7 is a diagrammatic representation of the data processing system associated with the wearable notification device(s), according to one embodiment.

FIG. 7 is a diagrammatic representation of the data processing system 109 which is capable of processing a set of instructions to perform any one or more of the methodologies associated with the wearable notification device(s), according to one embodiment. In various embodiments, the data processing system 109 may operate as a standalone device and/or may be connected (e.g., networked through the network 100) to other machines. In a network deployment, the data processing system 109 may operate in the capacity of a server which connects to a client machine (e.g., the network based wearable notification device 106, the local based wearable notification device 108, etc.). While only one of the data processing system 109 is displayed in FIG. 1, the data processing system 109 may be any one or any collection of a personal computer (PC), a tablet PC, a set-top box (STB), a personal digital assistant (PDA), a cellular telephone, a web appliance, a network router, a switch and/or a bridge, an embedded system, and/or any machine capable of executing a set of instructions (sequential and/or otherwise) that specify actions to be taken by the machine.

One example of the data processing system 109 may include a processor 702 (e.g., a central processing unit (CPU) or the CPU and a graphics processing unit (GPU)), a main memory 704, and a static memory 706, which communicate to each other via a bus 708. The data processing system 109 may further include a video display unit 710 (e.g., a liquid crystal display (LCD) and/or a cathode ray tube (CRT)), an alphanumeric input device 712 (e.g., a keyboard), a cursor control device 714 (e.g., a mouse), a disk drive unit 716, a signal generation device 718 (e.g., a speaker), and a network interface device 720.

The disk drive unit 716 includes a machine-readable medium 722 on which is stored one or more sets of instructions (e.g., instructions 724) embodying any one or more of the methodologies and/or functions described herein. The instructions 724 may also reside, completely and/or at least partially, within the main memory 704 and/or within the processor 702 during the execution thereof by the data processing system 109, wherein the main memory 704 and the processor 702 may also constitute machine-readable media.

The instructions 724 may further be transmitted and/or received over the network 100 via the network interface device 720. While the machine-readable medium 722 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" should also be taken to include any medium that is capable of storing, encoding, and/or carrying a set of instructions for execution by the machine and that causes the machine to perform any one or more of the methodologies of the various embodiments. The "machine-readable medium" shall accordingly be taken to include, but not limited to, solid-state memories, optical and magnetic media, and carrier wave signals.

Figure 8:
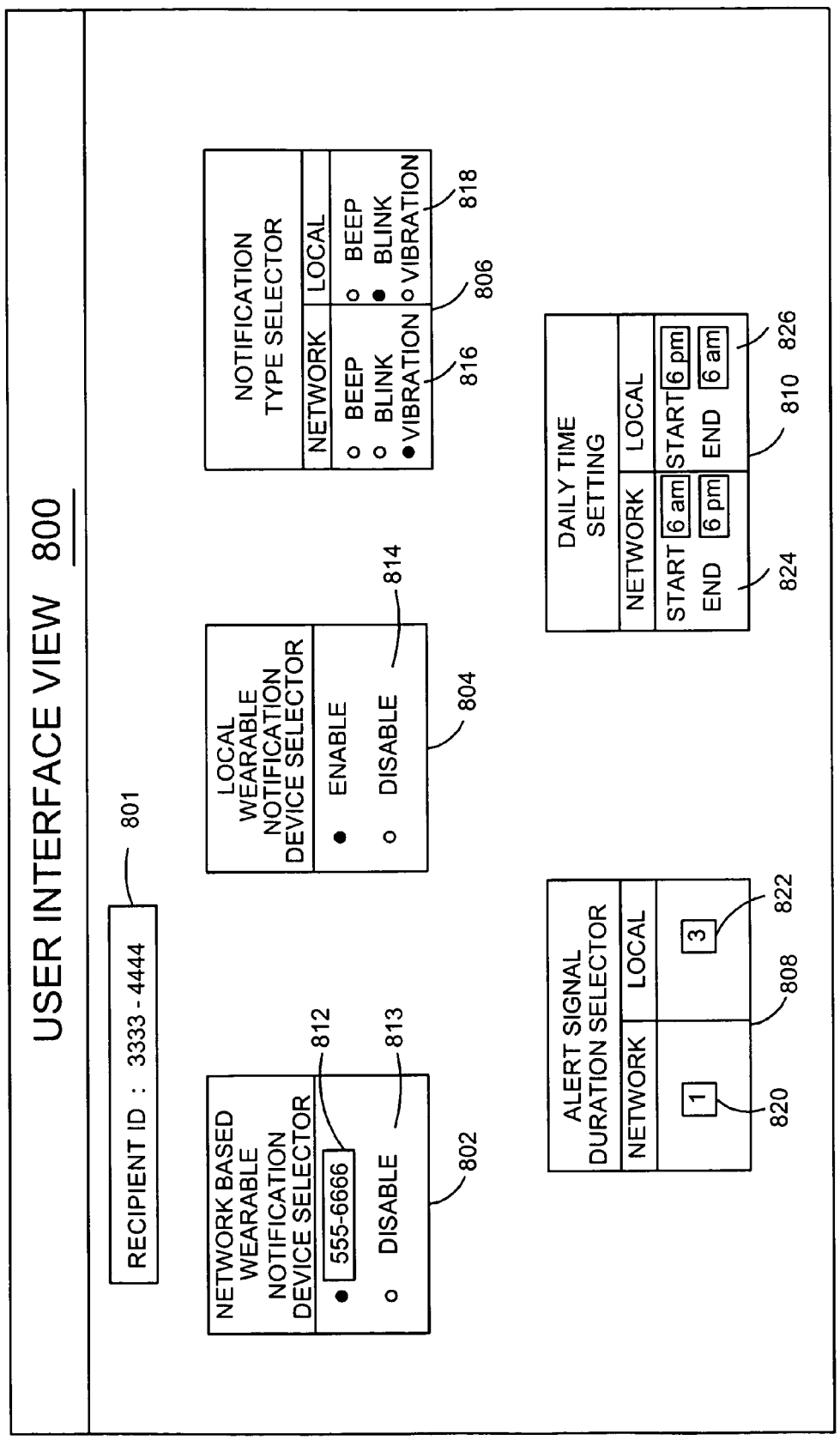
FIG. 8 is a user interface view of the data processing system, according to one embodiment.

FIG. 8 is a user interface view 800 of the data processing system 109, according to one embodiment. The user interface view 800 may include a recipient ID 801, a network based wearable notification device selector 802, a local wearable notification device selector 804, a notification type selector 806, an alert signal duration selector 808, and a daily time setting 810.

The recipient ID 801 may display an ID (e.g., an IP address, a cell phone number, etc.) of the receiver communication device 104 of FIG. 1. The network based wearable notification device selector 802 may include the ID of the network based wearable notification device 812 associated with the receiver communication device 104 and a disable button 813. The ID of the network based wearable notification device 812 may be entered via the data processing system 109 of FIG. 1 as an input data. The network based wearable notification device 812 may be disabled by selecting the disable button 813. The local wearable notification device selector 804 may be used to enable or disable the local wearable notification device 108 via selecting an enable/disable button 814.

The notification type selector 806 may be used to select a network notification type 816 (e.g., beep, blink, vibration, etc.) and/or a local notification type 818 (e.g., beep, blink, vibration, etc.). The alert signal duration selector 808 may include an alert signal duration selector for the network based wearable notification device 820 and/or an alert signal duration selector for the local based wearable notification device 822. In one example, the alert signal duration selector 808 may select 1 ring or 1 second for the duration of an alert signal before the trigger data 122 is transmitted from the trigger module 114 of the receiver communication device 104. The daily time setting 810 may include a daily time setting for the network based wearable notification device 824 and/or a daily time setting for the local wearable notification device 826. For example, the daily time setting 810 may enable the network based wearable notification device 106 from 6 a.m. to 6 p.m., and then enable the local wearable notification device 108 from 6 p.m. to 6 a.m.

Figure 9:
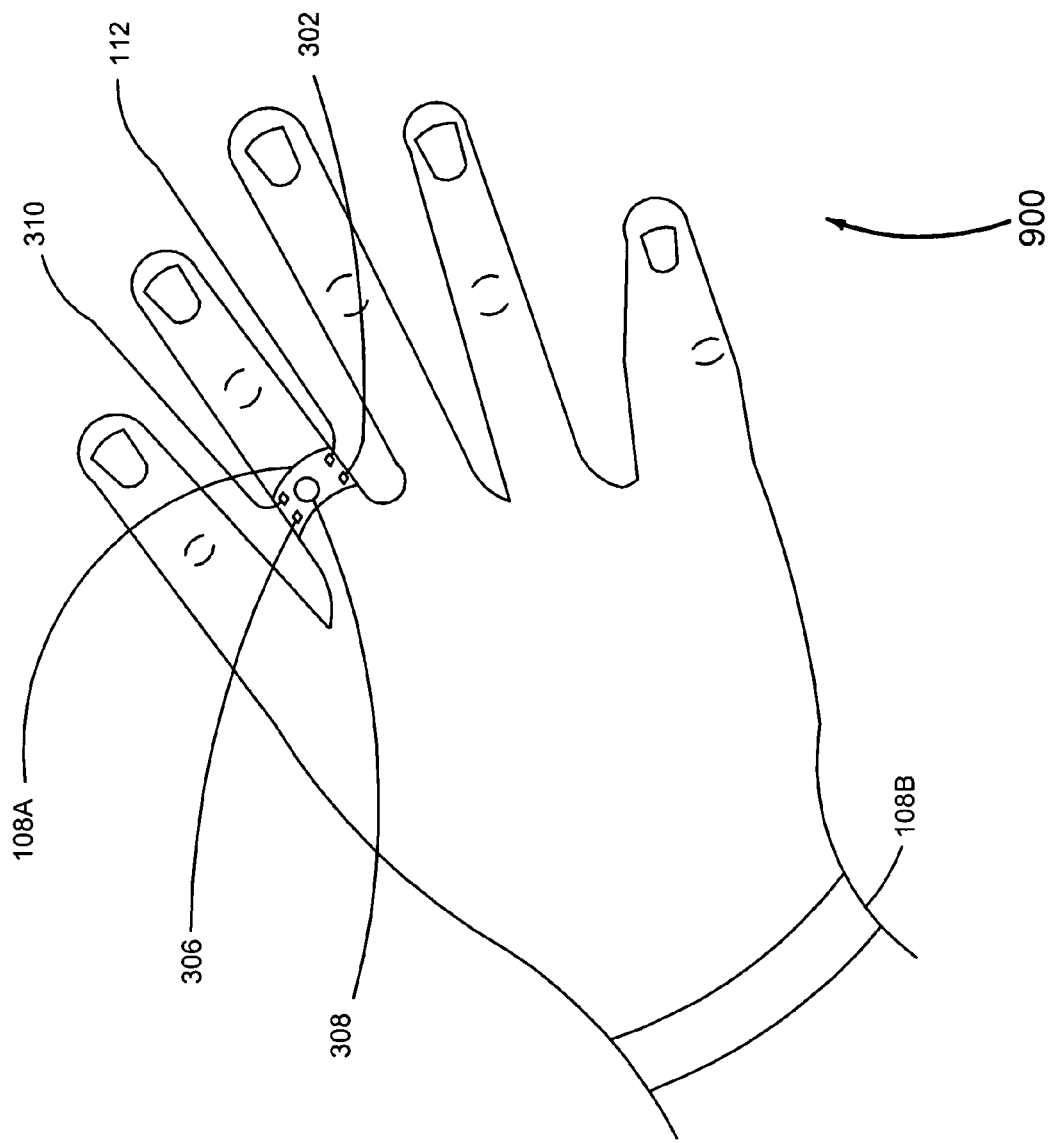
FIG. 9 is an apparatus view of a local wearable notification device embedded in a ring and a local wearable notification device embedded in a bracelet, according to one embodiment of the local wearable notification device.

FIG. 9 is an apparatus view of a local wearable notification device embedded in a ring 108A and a local wearable notification device embedded in a bracelet 108B, according to one embodiment of the local wearable notification device 108. The local wearable notification device embedded in the ring 108A (e.g., it will be hard to miss the vibration on the human tissue) may include the local reception antenna 112, the cell battery 302, the vibration module 306, the LED module 308, the audio sound module 310, and a housing which is physically coupled to a biological external tissue of a human body. The local wearable notification device embedded in the bracelet 108B and a local wearable notification device embedded in a necklace 108C (shown in FIG. 10) may include at least the modules of the local wearable notification device embedded in the ring 108A. The wearable device(s) embedded in the jewelries will make it easier for a user to carry them and may fulfill a decorative purpose as well.

Figure 10:
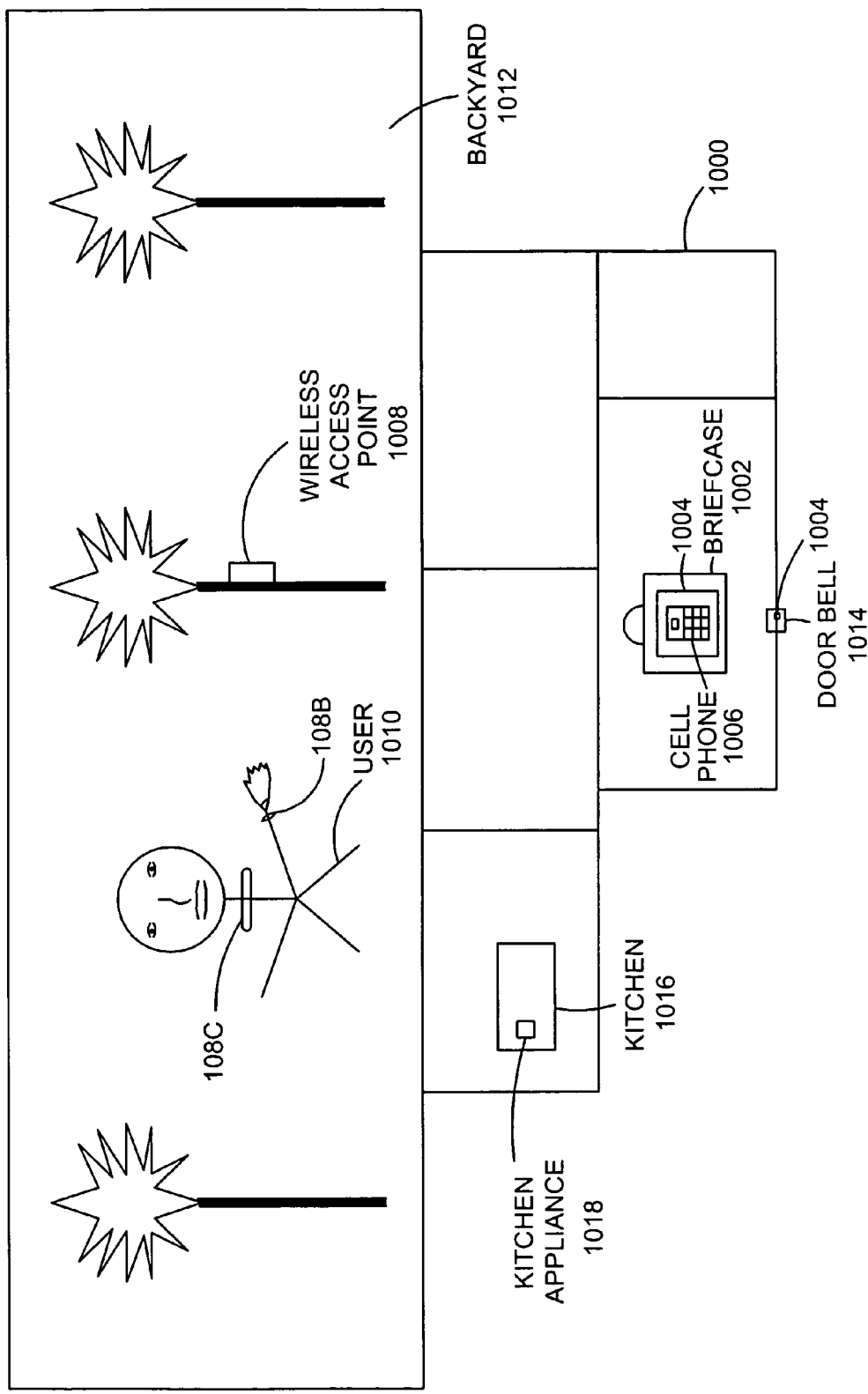
FIG. 10 is an interaction view between the local wearable notification device in the bracelet, the local wearable notification device in the necklace, and various device(s) including a receiver communication device, a cell phone, a wireless access point, a door bell, and a kitchen appliance, according to one embodiment.

FIG. 10 is an interaction view between the local wearable notification device embedded in the bracelet 108B, the local wearable notification device embedded in the necklace 108C, and various device(s) including a receiver communication device 1004, a cell phone 1006, a wireless access point 1008, a door bell 1014, and a kitchen appliance 1018, according to one embodiment. In FIG. 10, a user 1010 strolling in a backyard 1012 is illustrated as being notified (e.g., with the vibration, the auditory sound, the visual display, etc.) of an incoming call (e.g., the incoming signal 103 of FIG. 1) to the cell phone 1006 and/or of a depression to the doorbell 1014 when the receiver communication device 1004 contained in the user's briefcase 1002 and/or embedded in the doorbell 1014 sends the trigger data 122 to the user's networked based wearable notification device embedded in the bracelet 106B and/or in the necklace 106C via the network 100 and then via the wireless access point 1008 (e.g., this may be useful for people who enjoys spending their time in the backyard). The user 1010 may also be notified via the network based wearable notification device 106 embedded in the kitchen appliance 1018 (e.g., a microwave oven) with a timer in a kitchen 1016 when the processing the incoming signal is performed based on a parameter value of the kitchen appliance 1018 having the timer (e.g., this may be convenient for a man or a woman who like to spend time in the kitchen).

In another example, the incoming signal 103 of FIG. 1 may be processed based on a call to the cell phone 1006 and/or of a state change (e.g., depression) of the doorbell 1014 when the receiver communication device 1004 contained in the user's briefcase 1002 and/or embedded in the doorbell 1014 sends the trigger data 122 to the user's bracelet 108B and/or to the user's necklace 108C from the trigger module 114 of the receiver communication device 104 to the notification module 116 of the user's local wearable notification device(s) in the bracelet 108B and in the necklace 108C directly.

Although the present embodiments have been described with reference to a specific example embodiment, it will be evident that various modifications and changes may be made to these embodiments without departing from the broader sprit and scope of the invention. The various modules, processors, memories, etc. described herein may be performed and created using hardware circuitry (e.g., CMOS based logic circuitry), firmware, software and/or any combination of hardware, firmware, and/or software (e.g., embodied in a machine readable medium).

For example, the trigger module 114, the notification module 116, and the resolution module 118 may be embodied using transistors, logic gates, and electrical circuits (e.g., application specific integrated ASIC circuitry) using an input circuit, a recording circuit, a memory circuit, an interface circuit, a notification circuit, an output circuit, a control circuit, a liquid crystal display circuit, a clock circuit, a processor circuit, a parameter setting circuit, and/or a resolution circuit. In addition, it will be appreciated that the various operations, processes, and methods disclosed herein may be embodied in a machine-readable medium and/or a machine accessible medium compatible with a data processing system (e.g., a computer system). Accordingly, the specification and drawings are to be regarded in an illustrative rather than a restrictive sense.

What is claimed is:
1. A method, comprising:
communicating a trigger data to a wearable notification device when processing an incoming signal;

automatically generating a response on the wearable notification device based on the trigger data;
remotely programming at least one parameter associated with the wearable notification device, wherein the at least one parameter;
setting a start time of a day in which the wearable device is operable through the remote programming of the at least one parameter associated with the wearable notification device;
setting an end time of the day in which the wearable device is inactive through the remote programming of the at least one parameter associated with the wearable notification device;
automatically permitting the wearable device to functional only between the start time and the end time of each day;
permitting a local override of a network based programming of the wearable device through the remote programming; and
and processing the incoming signal on a microprocessor in a housing detachable attached to a receiver communication device.

2. The method of claim 1 wherein the remotely programming at least one parameter associated with the wearable notification device is based on an input data received in a network enabled application.

3. The method of claim 2 wherein the at least one parameter includes at least one of a source of the trigger data, and a delay of the response.

4. The method of claim 1 further comprising simultaneously generating an alert signal on a two-way mobile communication device and on the wearable notification device based on the incoming signal.

5. The method of claim 4 wherein the alert signal is at least one of a vibration, an auditory sound, and a visual display.

6. The method of claim 1 wherein the wearable notification device is at least one of a ring, a bracelet, and a necklace.

7. The method of claim 6 wherein the incoming signal is processed based on a parameter value of a kitchen appliance having a timer.

8. The method of claim 6 wherein the incoming signal is processed based on a state change of a doorbell.

9. The method of claim 1 wherein the wearable notification device is physically coupled to a biological external tissue of a human body.

10. The method of claim 1 further comprising:
registering an Internet Protocol (IP) address of the wearable notification device on an IP network through a wireless access point;
generating the trigger data through the wireless access point; and
transmitting an acknowledgement of the response to a central database of the IP network.

11. The method of claim 10 further comprising processing the incoming signal based on a receipt of at least one of a markup language document, a facsimile, a phone call, and a calendar reminder appointment.

12. The method of claim 1 further comprising
embedding a radio frequency identification (RFID) tag in the wearable notification device; and
generating the trigger by a RFID host controller that identifies a presence of the wearable notification device within an operable range of the RFID tag.

13. The method of claim 1 in a form of a machine-readable medium embodying a set of instructions that, when executed by a machine, cause the machine to perform the method of claim 1.

14. A method, comprising:
means for detecting a wearable notification device is registered on a network;
means for generating a parameter setting associated with the wearable notification device;
means for setting a start time of a day in which the wearable device is operable through the remote programming of the at least one parameter associated with the wearable notification device;
means for setting an end time of the day in which the wearable device is inactive through the remote programming of the at least one parameter associated with the wearable notification device;
means for automatically permitting the wearable device to functional only between the start time and the end time of each day;
means for permitting a local override of a network based programming of the wearable device through the remote programming;
means for wirelessly communicating the parameter setting to the wearable notification device; and
means for processing the incoming signal on a microprocessor in a housing detachably attached to a receiver communication device.

15. The method of claim 14 wherein the means for detecting a wearable notification device is registered on the network is performed through a radio frequency identification (RFID) method.

16. The method of claim 14 further comprising means for disabling at least one operation of the wearable notification device to conserve battery life in the wearable notification device.

17. An apparatus, comprising:
a notification module coupled to a biological external tissue to process a trigger data received wirelessly from a communication device and to generate a response;
a selection module to allocate a parameter setting to the response based on a network enabled application setting,
wherein the selection module to set a start time of a day in which the wearable device is enabled through the remote programming of the at least one parameter associated with the wearable notification device,
wherein the selection module to set an end time of the day in which the wearable device is inactive through the remote programming of the at least one parameter associated with the wearable notification device,
wherein the selection module to automatically permit the wearable device to functional only between the start time and the end time of each day,
wherein the selection module to permit a local override of a network based programming of the wearable device through the remote programming; and
a microprocessor in a housing detachably attached to a receiver communication device to process an incoming signal.

18. The apparatus of claim 17, further comprising a local response module for determine whether the communication device is an intermediate network element or a local transmitter.

* * * * *